United States Patent
Hardesty et al.

(10) Patent No.: US 7,578,125 B2
(45) Date of Patent: Aug. 25, 2009

(54) EXHAUST MANIFOLD WITH CATALYTIC CONVERTER SHELL TUBE

(75) Inventors: Jeffrey B. Hardesty, Byron, MI (US); Alan E. Kasten, New Berlin, WI (US)

(73) Assignee: Katcon Global S.A., Grand-Duchy of Luxembourg (LU)

( * ) Notice: Subject to any disclaimer, the term of this patent is extended or adjusted under 35 U.S.C. 154(b) by 0 days.

(21) Appl. No.: 11/805,509

(22) Filed: May 22, 2007

(65) Prior Publication Data
US 2007/0227131 A1    Oct. 4, 2007

Related U.S. Application Data

(62) Division of application No. 09/738,251, filed on Dec. 15, 2000, now Pat. No. 7,241,426.

(51) Int. Cl.
*F01N 7/10* (2006.01)
(52) U.S. Cl. .................. 60/323; 60/274; 60/313; 60/324

(58) Field of Classification Search .................. 60/274, 60/302, 313, 323, 324
See application file for complete search history.

(56) References Cited

U.S. PATENT DOCUMENTS 4,353,873 A * 10/1982 Noritake et al. ............. 422/179
6,555,070 B1 * 4/2003 Kruger ....................... 422/179

* cited by examiner

*Primary Examiner*—Thomas E Denion
*Assistant Examiner*—Diem Tran
(74) *Attorney, Agent, or Firm*—Butzel Long

(57) ABSTRACT

A catalytic converter subassembly having at least one component inserted during the manufacture of a cast exhaust manifold, thereby eliminating a costly and undesirable manifold to converter weld.

The method and converter subassembly comprise a converter shell for housing a catalyst substrate adapted to be securely attached to an exhaust manifold during manufacture of the manifold to eliminate an undesirable weld between the manifold and converter.

23 Claims, 5 Drawing Sheets

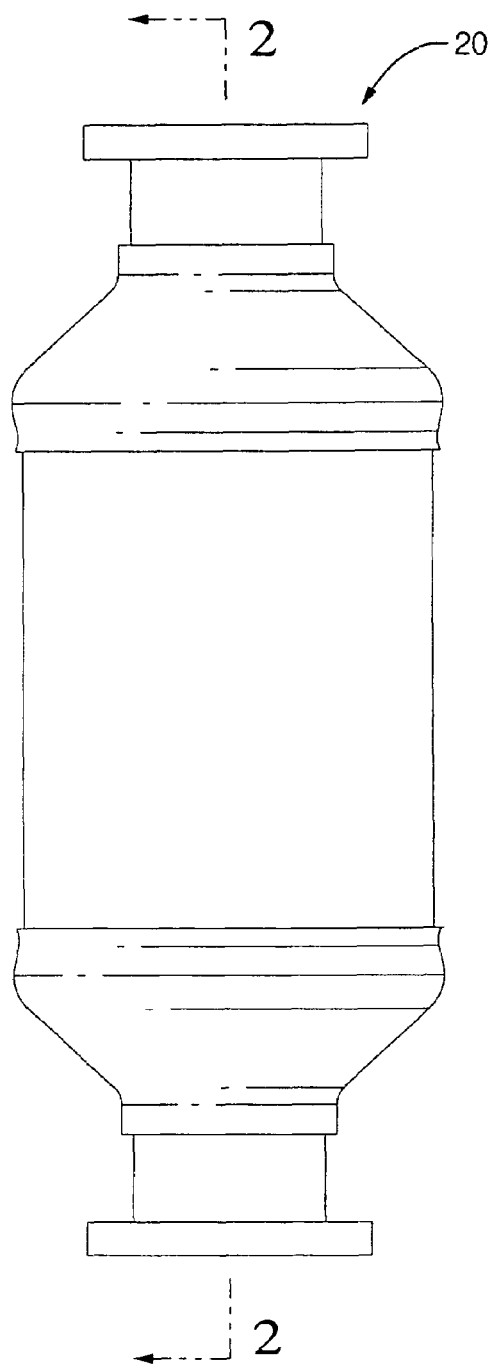
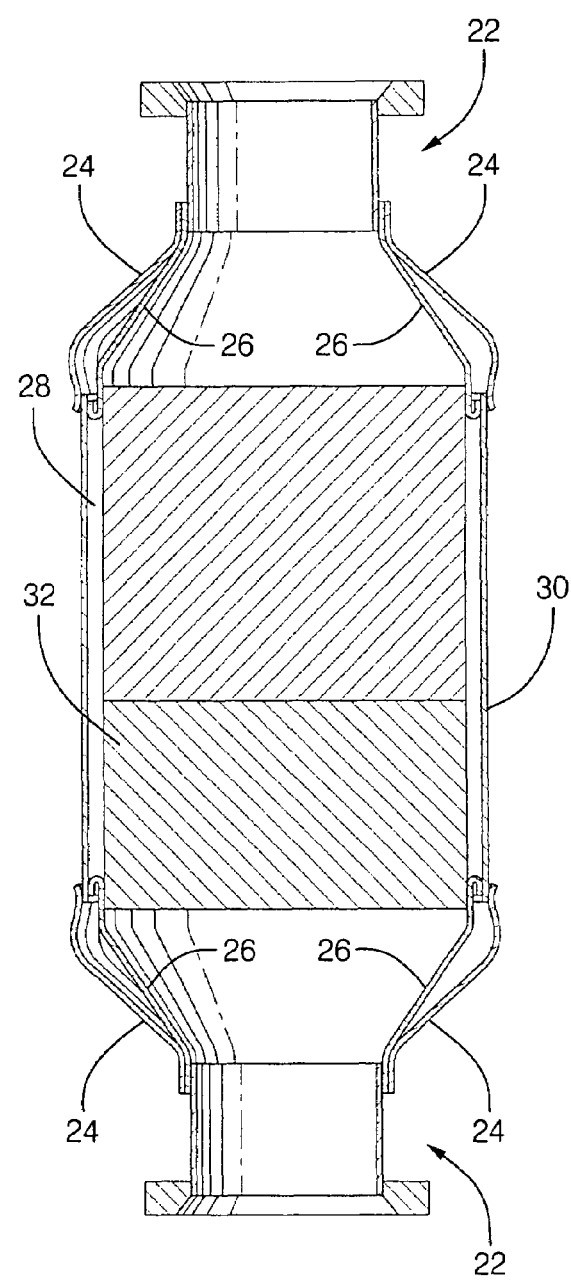
PRIOR ART
FIG. 1
PRIOR ART
FIG. 2

EXHAUST MANIFOLD WITH CATALYTIC CONVERTER SHELL TUBE

This application is a divisional application of U.S. Ser. No. 09/738,251, filed Dec. 15, 2000, now issued as U.S. Pat. No. 7,241,426, granted 10 Jul. 2007.

TECHNICAL FIELD

The present invention relates to catalytic converters for mobile vehicles and, more particularly, to an apparatus and method for manufacturing a catalytic converter.

BACKGROUND OF THE INVENTION

Catalytic converters are universally employed for oxidation of carbon monoxide and hydrocarbons and reduction of the oxides of nitrogen in automobile exhaust gas streams. A catalyst substrate comprising a catalyst, disposed within the shell of the catalytic converter, facilitates the oxidation and reduction process of the exhaust gas stream. Catalyst substrates tend to be frangible and have coefficients of thermal expansion differing markedly from their metal, usually stainless steel, shells. As a result, the mounting means of the substrate, typically a mat support material disposed between the catalyst substrate and the shell, must provide resistance to mechanical shock due to impacts and vibrations and to thermal shock due to thermal cycling. Both thermal and mechanical shock may cause deterioration of the mat support material, which once started, quickly accelerates and ultimately renders the device useless.

Intumescent and non-intumescent sheet mat support materials do an adequate job of holding the substrate in place while resisting erosion at moderate exhaust temperatures, and moderate pressure pulsations of the exhaust gas. However, when positioning the catalytic converter closer to the engine exhaust manifold, the converter, including the mat support materials are subjected to much higher exhaust temperatures. Under these conditions, over a period of time, existing mat support materials can be eroded.

A catalytic converter may be placed anywhere in the exhaust system. However, it is advantageous to locate a catalytic converter as close as possible to the combustion chamber in an engine compartment. Placing a catalytic converter closer to the combustion chamber quickens the converter's light-off time. The light-off time is the point at which the catalyst reaches fifty percent efficiency over a period of time (measured in seconds) during start-up of the automobile.

Placing catalytic converters into an engine compartment, however, creates additional packaging constraints. "Packaging constraints" is an industrial term referring to the question, "how do we fit a part in a vehicle?", taking into consideration the space and volume of the area of interest, including the parts nearby and the interaction of those parts.

Generally, a catalytic converter 20 utilizes a pair of endcone assemblies 22 welded onto a shell 30 to provide a gas tight seal and for attaching the converter to the mobile vehicle's exhaust system (See FIGS. 1 and 2). Typically, endcone assemblies 22 comprise both an outer endcone 24 and an inner endcone 26. Inner endcone 26 reduces the likelihood of mat erosion and thermal deterioration of a mat support material 28 during operation of converter 20. Inner endcone 26 is welded into outer endcone 24 using a costly and inefficient manufacturing procedure. When outer endcone 24 is welded onto shell 30, inner endcone 26 is inserted "blind" into mat support material 28, which is wrapped around a catalyst substrate 32 and concentrically disposed within shell 30 (FIG. 2).

The "blind" insertion of inner endcone 26 can periodically cause catalyst substrate 32 to break during assembly of converter 20. As a result, alternatives are being sought for inner endcone 26.

Some catalytic converter designs, and especially designs without inner endcones, incorporate an edge protection material around the intake area of the catalyst substrate to reduce thermal deterioration of the mat support material (e.g., mat protection ring or endring). Incorporating edge protection materials while assembling a catalytic converter, however, requires additional labor. In addition, edge protection materials increase the overall weight of the catalytic converter as well as its cost. This, in turn, ultimately reduces the chances of meeting the customer's requirements.

A catalyst disposed on a frangible substrate is supported within the catalytic converter to facilitate the oxidation and reduction process of the exhaust gas stream. During operation, the exhaust gases pass over the substrate and contact the catalyst where the amount of hydrocarbons, carbon monoxide, and oxides of nitrogen are reduced. The temperature of the catalyst is typically between 750° C. and 950° C. and may be higher depending upon the location of the catalytic converter relative to the engine of the automobile. To lessen the effects of this high temperature, a support material cushions and insulates the catalyst material from a housing in which the substrate and catalyst are mounted.

Currently, manifold converters are manufactured by welding cast or fabricated exhaust manifolds to a catalytic converter shell. Thin-wall castings are also available that incorporate the converter shell and manifold into a single casting. Fabricated manifolds are easily joined to converter shells, but are difficult to manufacture compared to a casting of the same. Conventional welding techniques have been commonly used to form and join these catalytic converters to exhaust manifolds. However, the microstructure of nodular cast iron exhaust manifolds is not designed for welding. If welded, the microstructure has a band of high hardness martensite immediately adjacent to the weld in the heat-affected zone. A welding filler metal with intermediate thermomechanical properties having a sufficient high temperature strength and toughness is required for the manifold converter to survive. The welding filler is quite expensive, however, and the welding operation must be closely monitored.

Thin-walled castings eliminate the welding operation, but the thin-walled castings are still 3-4 mm thick compared to the 1.5 mm thick wrought shell. The thin-walled castings add mass and decrease converter performance due to the increased thickness. On the other hand, cast and fabricated stainless steel manifolds eliminate the cast iron welding difficulties, but are extremely expensive.

In addition, the drawbacks of conventional welding techniques include the creation of a high amount of heat that risks damage to the parts being welded. Another drawback is that dissimilar metals and work pieces of different gauge thicknesses cannot be joined, thereby limiting the materials used in forming catalytic converters. Lastly, conventional designs of the sheet metal or cast-metal heat resistant shells incorporate several welding steps. Welding is not only costly from an equipment standpoint due to the amount of materials, consumables, and labor associated with the process, but also leads to considerable in-plant control costs and warranty.

Accordingly, there remains a need in the art for an apparatus and method for manufacturing a catalytic converter attachable to an exhaust manifold without a welded joint that is cost effective.

SUMMARY OF THE INVENTION

The drawbacks and disadvantages of the prior art are overcome by a catalytic converter subassembly having at least one component inserted during the manufacture of a cast exhaust manifold to form a gas tight seal, thereby eliminating a costly and undesirable manifold to converter weld.

BRIEF DESCRIPTION OF THE DRAWINGS

Referring to the drawings wherein like elements are numbered alike in the several Figures:

FIG. 1 is a plan view of a prior art catalytic converter;

FIG. 2 is a cross-sectional view taken from line 2-2 of the catalytic converter of FIG. 1 depicting inner endcone;

DESCRIPTION OF THE PREFERRED EMBODIMENT

The catalytic converter typically contains either a mat protection ring (end ring) or an inner endcone that: (1) shields the shell from high temperature exhaust gas which can overheat the mat support material under certain high temperature conditions; (2) reduces the temperature of the catalytic converter's outer surface; and/or (3) protects the mat support material from exhaust gas erosion.

Figure 4:
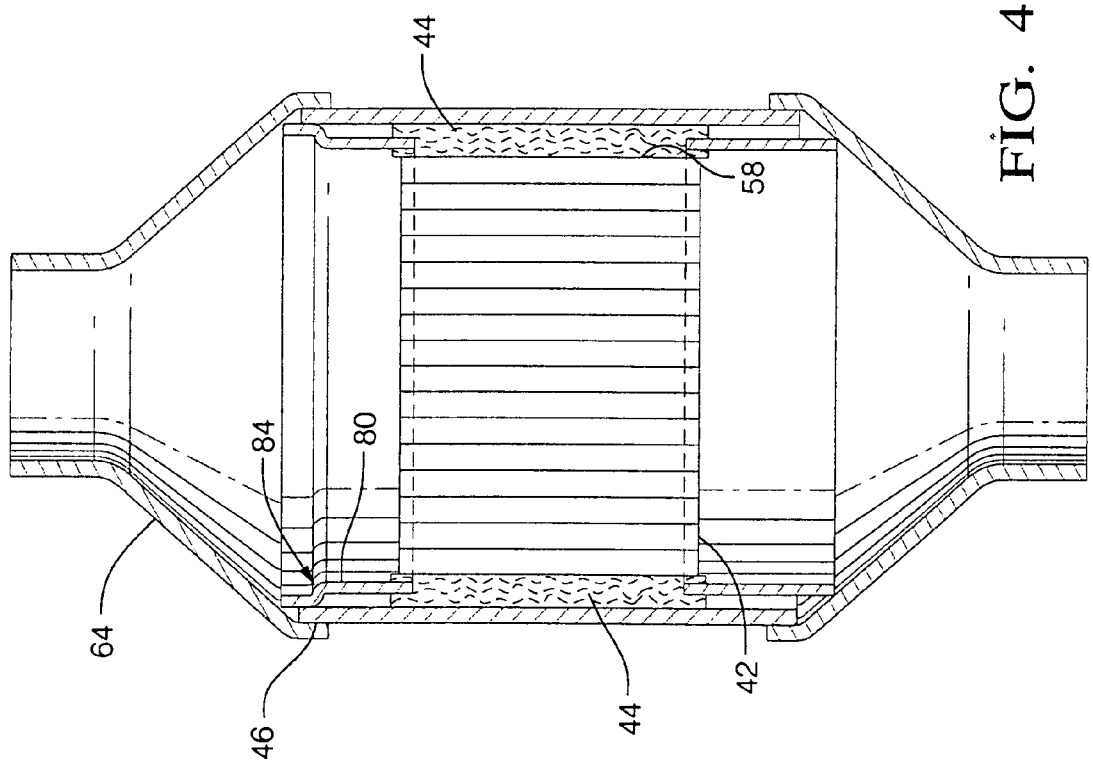
FIG. 4 is a cross-sectional view of another catalytic converter depicting another mat protection ring.
Figure 3:
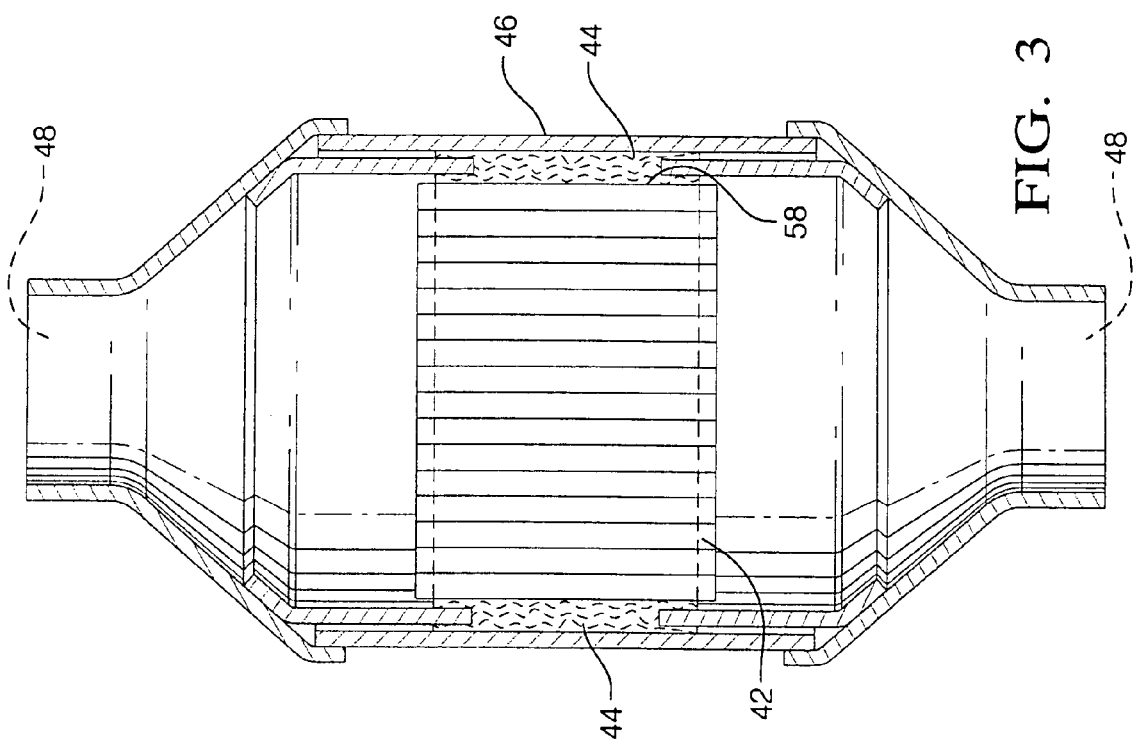
FIG. 3 is a cross-sectional view of a catalytic converter having a mat protection ring.

Referring to FIGS. 3 and 4, located in between catalyst substrate 42 and a catalytic converter shell 46 is a mat support material 44 that insulates the shell from both the high exhaust gas temperatures and the exothermic catalytic reaction occurring within a catalytic converter 40. The mat support material 44 further enhances the structural integrity of catalyst substrate 42 by applying compressive radial forces about it, reducing its axial movement, and retaining it in place. The mat support material 44 can either be a simple non-intumescent ceramic material, or an intumescent material, e.g., one which contains a vermiculite component that expands with heating to maintain firm compression when the shell 46 expands outward from the catalyst substrate 42, as well as materials which include a combination of both.

The mat support material 44/catalyst substrate 42 subassembly can preferably be inserted into shell 46. Shell 46 includes at least one opening 48 for receiving the subassembly. The subassembly can preferably be disposed concentrically within and surrounded by shell 46. The choice of material for the shell 46 can depend upon the type of exhausts gas, the maximum temperature of the exhaust gas, the maximum temperature reached by the catalyst substrate 42, and the like. Suitable materials for the shell 46 can comprise any material that is capable of resisting under-car salt, temperature and corrosion. Typically, ferrous materials are employed such as ferritic stainless steels. Some ferritic stainless steels include grades taken from the 400-Series such as SS-409, SS-439, and SS-441, with grade SS-409 generally preferred.

Typically, the mat support material 44/catalyst substrate 42 subassembly can be inserted into shell 46 using a stuffing cone, for example. The stuffing cone is a device that compresses mat support material 44 concentrically about catalyst substrate 42 using a ramming component. The ramming component then stuffs the compressed mat support material 44/catalyst substrate 42 subassembly into shell 46 without peeling mat support material 44 away from the outer periphery 58 of catalyst substrate 42. In the alternative, a compressive sizing operation can be employed once the subassembly is disposed concentrically within shell 46. Shell 46 can be compressively sized to achieve the desired mat pressure to be exerted upon catalyst substrate 42.

Figures 5, 6:
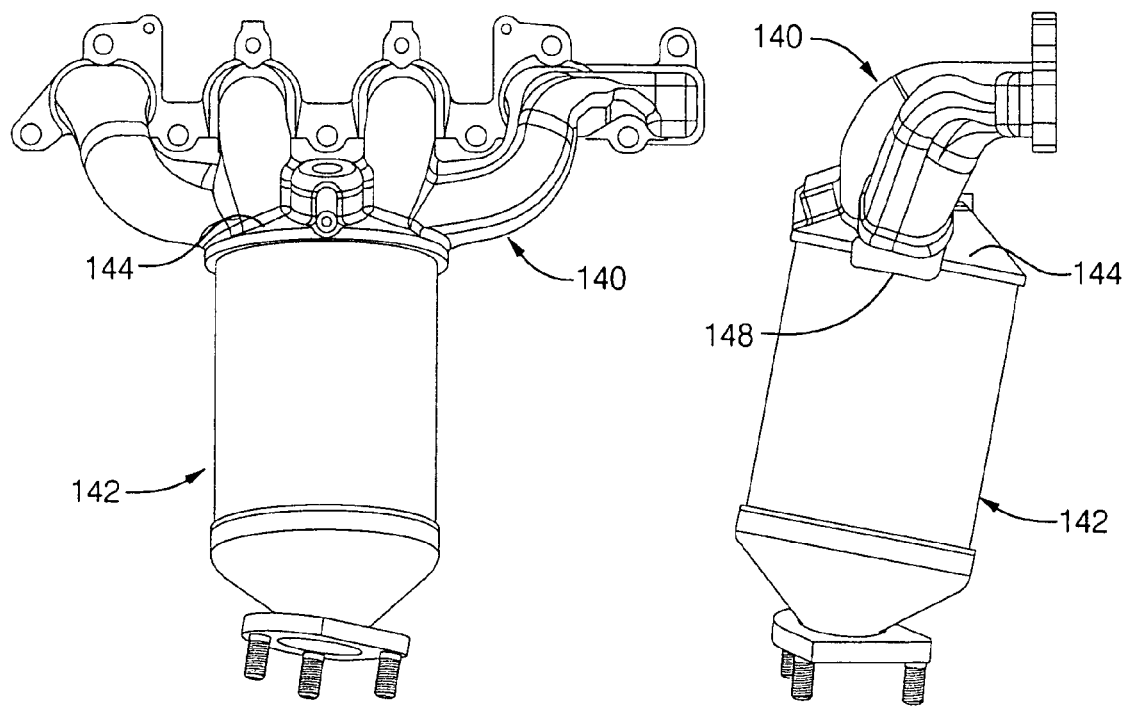
FIG. 5 is a front view of an exemplary embodiment of an exhaust manifold attached to an exemplary embodiment of a catalytic converter.
FIG. 6 is a side view of an exemplary embodiment of the exhaust manifold attached to the exemplary embodiment of a catalytic converter shown in FIG. 5.
Figure 7:
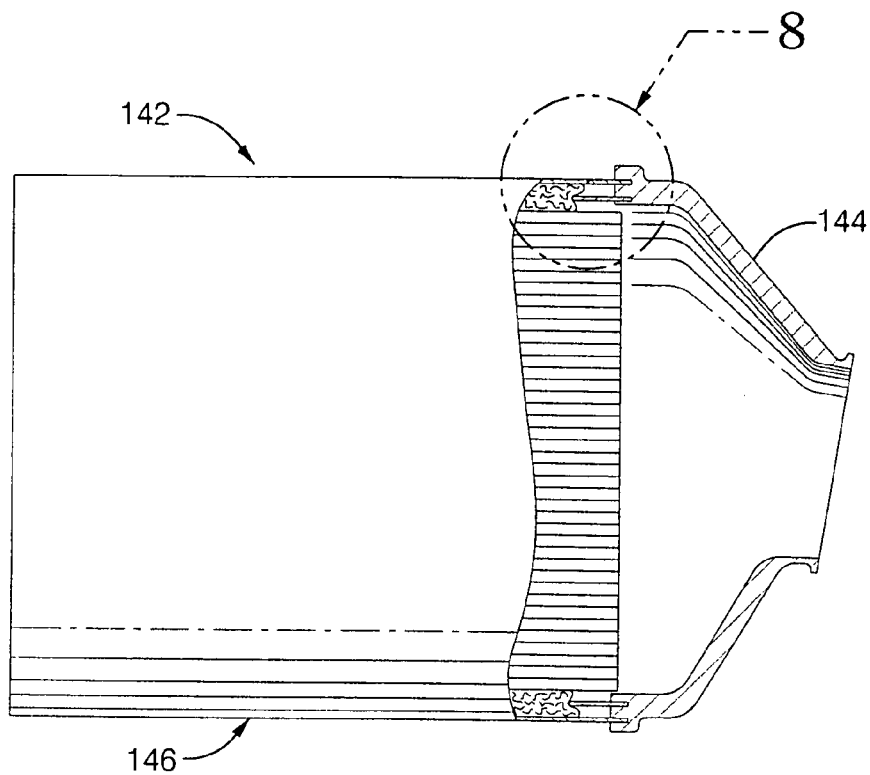
FIG. 7 is a partial cross-sectional view of the catalytic converter shown in FIGS. 5 and 6.
Figure 8:
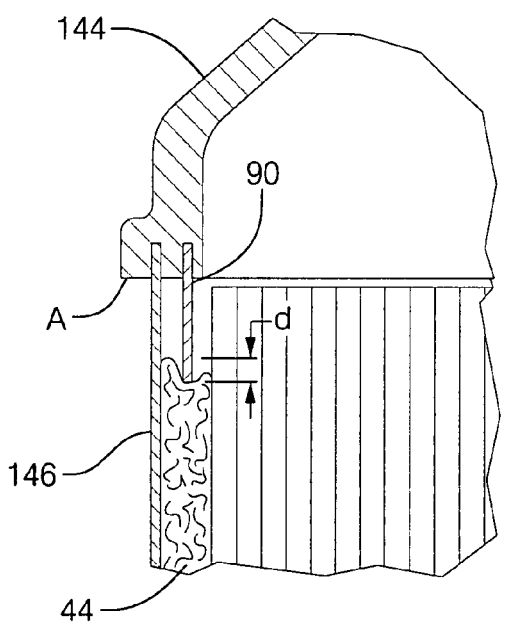
FIG. 8 is an enlarged partial cross-sectional view taken from area 8-8 of the catalytic converter shown in FIG. 7 showing a mat protection ring mounted therein.

Referring now to FIGS. 5-8, catalytic converter designs for attachment to exhaust manifolds are shown. An exhaust manifold 140, as shown in a front view in FIG. 5 and a side view in FIG. 6, is designed to collect exhaust gases exiting the cylinders of an engine. Exhaust manifold 140 comprises a collection of pipes or runners, whose number corresponds with the number of cylinders in the engine, which upon exiting the engine compartment, are bent and directed to a single collector body 144 leading to a catalytic converter 142, and then to an exhaust pipe. An exhaust manifold collector body 144 having a plurality of pipes or runners 148 can place exhaust manifold 140 in contact with catalytic converter 142 to create a manifold/converter. Catalytic converter 142, as shown in a partial cross-sectional view in FIG. 7 and an exploded partial cross-sectional view in FIG. 8, can include a mat protection ring 90. Mat protection ring 90 can be inserted into collector body 144 to penetrate the compressed mat support material 44. As illustrated in FIG. 8, mat protection ring 90 at one end penetrates mat support material 44 a certain distance, typically 2-8 mm, indicated by the letter "d". Referring now to FIG. 8, mat protection ring 90 and a shell 146 can be locked into position within exhaust manifold collector body 144 to form a gas tight seal by a casting operation of the exhaust manifold, for example, suspending aligning mat protection ring 90 and shell 146 in a mold for casting the exhaust manifold. Exhaust manifold collector body 144 and shell 146 can preferably be joined together at a juncture, indicated by the letter "A" in FIG. 8, without adding a weld flange to the collector body 144. The casting can preferably seal exhaust manifold collector body 144 and shell 146 together to provide a gas tight seal.

Figure 9:
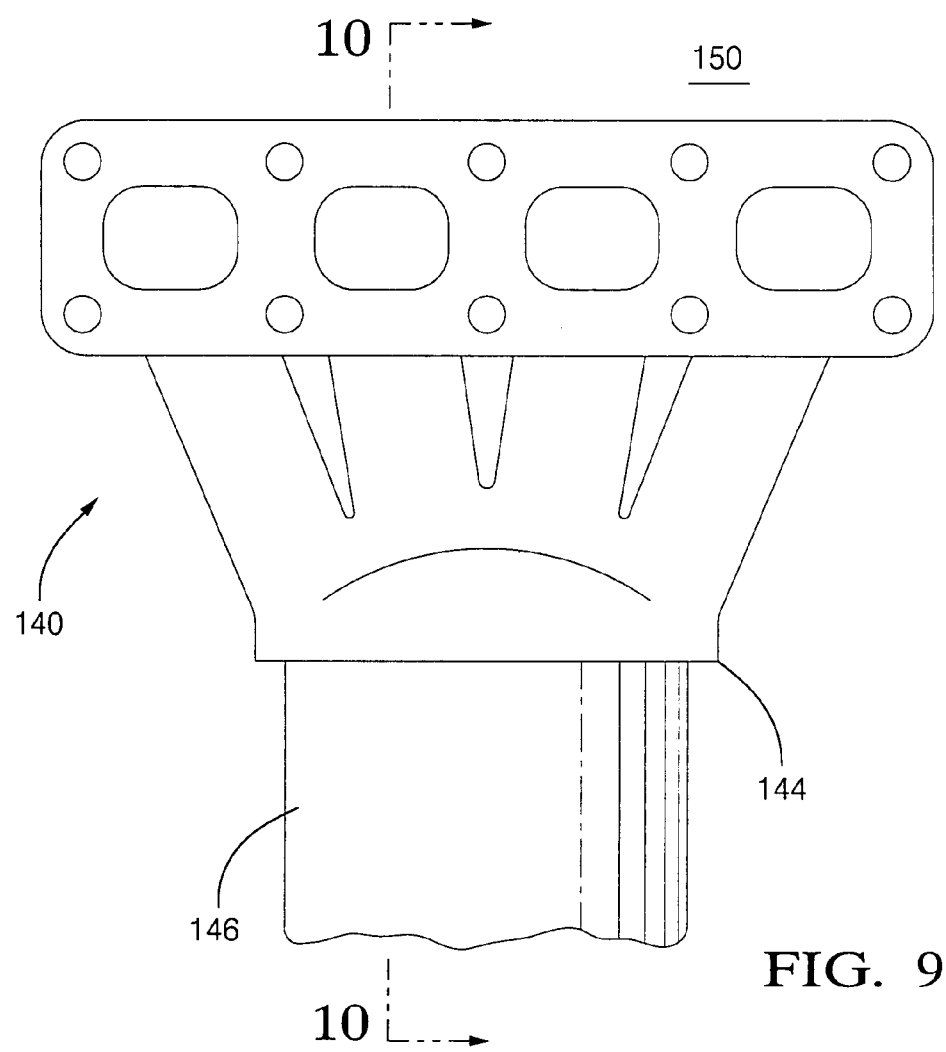
FIG. 9 is a plan view of a preferred embodiment of an exhaust manifold attached to a shell of a catalytic converter subassembly.
Figure 10:
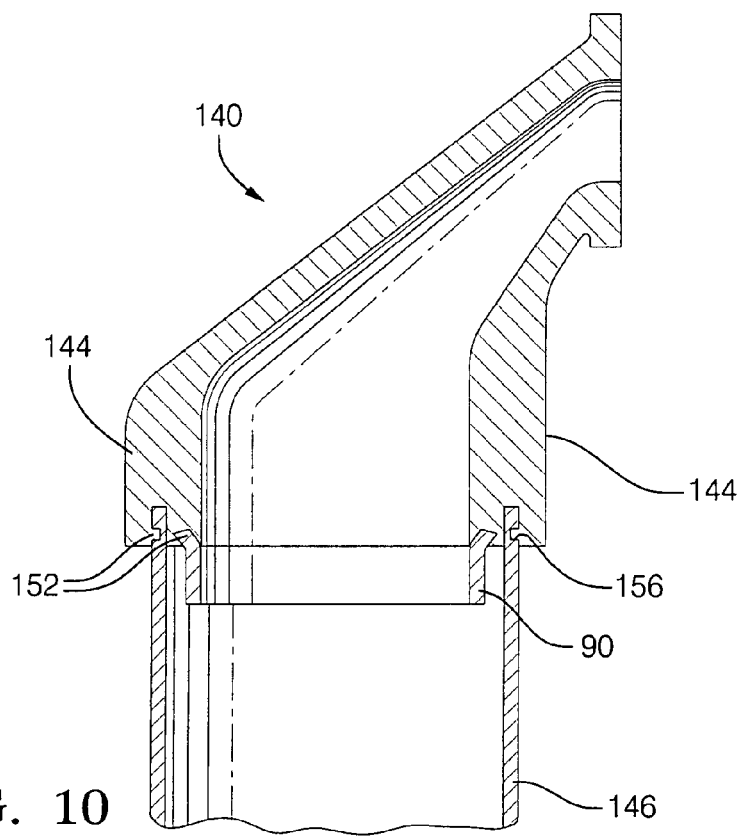
FIG. 10 is a cross sectional view taken from line A-A of the manifold/catalytic converter subassembly of FIG. 9.

In an exemplary embodiment depicted in FIGS. 9 and 10, an exhaust manifold 140 is shown having a shell 146 and mat protection ring 90 inserted into exhaust manifold collector body 144 during the manufacture and casting of exhaust manifold 140. During the casting of an exhaust manifold 140, catalytic converter components made of wrought material are inserted into a mold for an exhaust manifold 140 so that the converter components are cast into the manifold 140. The catalytic converter components may be in subassembly form (e.g., shell 146 with a mat protection ring 90, inner/outer endcone, endplate, etc. . . . ) or completed converter basic assembly. After the converter components are cast into the manifold, conventional converter manufacturing operations (e.g., stuffing, welding, spinforming, etc. . . . ) can be used. This method of manufacture eliminates the costly manifold to converter weld, and the high hardness, low ductility microstructure that is present in the weld heat affected zone of the cast iron manifold. Furthermore, by using converter components made from a material such as 409 stainless steel as opposed to extending the iron casting, the improved strength and corrosion resistance of the 409 stainless steel are gained without making the whole casting from 409 stainless steel. The wrought converter components, typically having a 1-2 mm wall thickness, also reduce the mass of the manifold/converter compared to thin wall castings having a 3-4 mm thickness.

FIG. 10 shows an exhaust manifold/converter 150 with a cast-in shell 146 and a mat protection ring 90. It should be noted that retention features 152 may be desired on the inserted ends of the converter components coupled exhaust manifold collector body 144 when there is not a metallurgical bond between the converter component inserted ends and the cast exhaust manifold 140. Retention features 152 may be features such as bumps, flares, grooves and any combination comprising at least one of the forgoing on the insert(s) that interlock with the casting. The mat protection ring 90 in FIG. 10 has a retention feature 152 to aid in the prevention of mat protection ring 90 from pulling out of the manifold collector body 144. Likewise, shell 146 has a groove 156 at one end that is received and interlocked when casting the manifold collector body 144 with the grooved end of shell 146 inserted.

Figure 11:
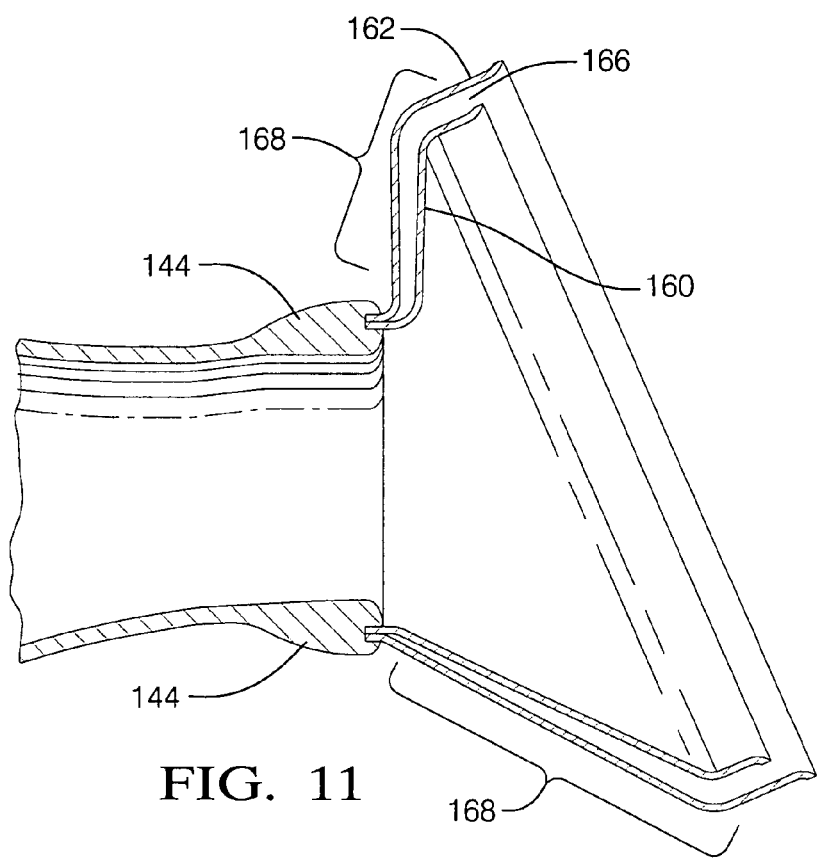
FIG. 11 is a cross sectional view of an alternative embodiment of an exhaust/catalytic converter subassembly depicting an outer endcone and an inner endcone.

FIG. 11 shows an alternative embodiment of a manifold/converter 150 having a cast-in inner endcone 160 and an outer endcone 162. Rather than leaving the air chamber empty so that a plenum 166 exists, a quantity of insulation material (not shown) can optionally be disposed around containment area 168 prior to casting.

Insulation material comprises materials such as fiberglass, ceramic mats, and/or mica based materials, including combinations comprising at least one of the foregoing, and the like. When inner endcone 160, outer endcone 162, insulation material (not shown), and the mat support material/catalyst substrate subassembly are assembled together, insulation material can be concentrically disposed within the air chamber and between the interior surface of outer endcone 162 and the exterior surface of inner endcone 160. Insulation material can further decrease the amount of heat transferred to outer endcone 162 from catalyst substrate and prevent deformation of outer endcone 162. It should be noted that the temperatures of the casting operation may restrict the use of endcone insulation material, however, an air gap between the endcones provides more of a thermal barrier than a solid casting of a manifold/converter assembly 150 while reducing the mass.

Modifying a shell is more efficient and, in the end, more cost effective and beneficial to consumers than encumbering the typical manufacturing process with additional steps and components. Additionally, modifying the shell to incorporate a flared or grooved end does not compromise customer packaging constraint requirements.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of manufacturing a catalytic converter subassembly comprising:
   forming a sheet metal catalytic converter shell having an open end;
   forming a catalyst substrate comprising a catalyst;
   disposing said catalyst substrate concentrically within said shell;
   disposing mat support material concentrically in between said catalyst substrate and said shell; and
   forming a cast iron exhaust manifold with an exhaust outlet, wherein said shell open end portion is insert cast within said manifold outlet to effect sealing interconnection therebetween, wherein said manifold outlet and said catalytic converter shell define cooperating integral retention features operative to affix the end portion of the catalytic converter shell within the cast exhaust manifold outlet.

2. A method of manufacturing a catalytic converter subassembly recited in claim 1, further comprising:
   disposing a mat protection ring concentrically within said shell; and
   contacting said mat support material with said mat protection ring.

3. A method recited in claim 2, wherein securing said shell and said mat protection ring further comprises insertion of one end of said shell and one end of said mat protection ring in a mold for casting an exhaust manifold aligned with a portion of said mold designated for said outlet.

4. The method recited in claim 3, wherein said shell and said mat protection ring are formed each having said ends further comprising a retaining feature for cast in place retention in said exhaust manifold.

5. The method recited in claim 4, wherein said retaining feature is selected from at least one of bumps, flares, grooves, and any combination comprising at least one of the foregoing.

6. A method of manufacturing a catalytic converter subassembly, comprising:
   disposing a mat support material concentrically round a catalyst substrate to form an assembly, wherein the catalyst substrate comprises a catalyst;
   disposing the assembly concentrically within a containment area of a sheet metal inner endcone;
   disposing the containment area within an inner endcone receiving area of a steel sheet metal outer endcone; and
   securing the inner endcone and the outer endcone to an outlet of a cast iron exhaust manifold by simultaneously insert casting open end portions of both said end cones to effect sealing interconnection with said manifold outlet, wherein said manifold outlet and said at least one of said endcones define cooperating integral retention features operative to affix the end portions of said endcones within the cast exhaust manifold outlet.

7. The method recited in claim 6, wherein securing the inner endcone and the outer endcone further comprises insertion of one end of said inner endcone and one end of said outer endcone in a mold for casting an exhaust manifold and aligned with a portion of said mold designated for said outlet.

8. The method recited in claim 7, wherein said outer endcone and said inner endcone are formed each having said ends further comprising a retaining feature for retention in said exhaust manifold.

9. The method recited in claim 8, wherein said retaining feature is selected from at least one of bumps, flares, grooves, and any combination comprising at least one of the foregoing.

10. A method of manufacturing a catalytic converter subassembly comprising:
forming a sheet metal shell having an open end portion;
aligning said open end portion within a mold for casting an iron exhaust manifold; and
casting said iron exhaust manifold with said open end portion inserted in a portion of said mold designated for exhaust outlet to effect insert casting thereof for sealing interconnection therebetween, wherein said manifold outlet and said catalytic converter shell define cooperating integral retention features operative to affix the end portion of the catalytic converter shell within the cast exhaust manifold.

11. The method recited in claim 10, further comprising:
forming a mat protection ring concentrically within said shell;
aligning an end of said mat protection ring within said mold for insert casting within said exhaust manifold; and
casting said exhaust manifold with said end inserted in a portion of said mold designated for exhaust outlet to effect interconnection therebetween.

12. The method recited in claim 10, wherein said shell comprises one of a shell tube and an outer endcone concentrically disposed around an inner endcone and insert cast within exhaust manifold.

13. The method recited in claim 12, wherein ends of said shell and said end of said mat protection ring include retaining features for retention in said exhaust manifold.

14. The method recited in claim 13, wherein said retaining features is selected from at least one of bumps, flares, grooves, and any combination comprising at least one of the foregoing.

15. A method of manufacturing a catalytic converter subassembly comprising:
forming a sheet metal catalytic converter shell having an open end portion;
forming a mat protection ring having first and second ends substantially concentrically disposed within said converter shell;
casting an iron exhaust manifold defining a collector body manifold wall wherein said converter shell end portion and said first end of said mat protection ring are insert cast in place within said manifold wall to effect sealed interconnections therebetween;
disposing a catalyst substrate in said converter shell; and
disposing a mat support material between said converter shell and said catalyst substrate,
wherein said collector body manifold wall, catalytic converter shell and mat protection ring define integral retention features operative to affix the end portion of the catalytic converter shell and the first end of the mat protection ring within the cast collector body manifold wall.

16. A method of manufacturing a catalytic converter subassembly comprising the steps of:
forming a cast iron exhaust manifold defining an integral collector body manifold wall;
forming a sheet metal catalytic converter shell having an end portion thereof cast in place within said manifold wall to effect a sealed interconnection therebetween;
providing a catalyst substrate disposed in said catalytic converted shell; and
providing mat support material disposed between said catalytic convener shell and said catalyst substrate,
wherein said collector body manifold wall and catalytic converter shell define cooperating integral retention features operative to interlock the end portion of the catalytic converter shell within the cast manifold collector body.

17. A method of manufacturing a catalytic converter subassembly comprising the steps of:
forming a cast exhaust manifold defining a collector body manifold wall;
forming a sheet metal catalytic converter shell, having an end portion thereof cast in place within said manifold wall to effect a sealed interconnection therebetween;
providing a catalyst substrate disposed in said catalytic converter shell;
providing mat support material disposed between said catalytic converter shell and said catalyst substrate; and
forming a sheet metal mat protection ring disposed substantially concentrically within said shell and including opposed first and second ends, wherein said first end of said mat protection ring is cast in place within said manifold wall adjacent the end portion of the catalytic converter shell, and the second end of said mat protection ring penetrating at least a portion of said mat support material,
wherein said collector body manifold wall, catalytic converter shell and mat protection ring define cooperating integral retention features operative to affix the end portion of the catalytic converter shell and the first end of the mat protection ring within the cast collector body manifold wall.

18. The method of claim 17, wherein the end portion of said catalytic converter shell is fixedly cast in place within said manifold wall such that said catalytic converter shell is locked into position within said manifold wall to form a gas tight seal therebetween.

19. The method of claim 17, wherein said manifold wall comprises a manifold wall thickness greater than a catalytic converter shell thickness of said catalytic converter shell.

20. The method of claim 19, wherein said manifold wall thickness is 3 mm to 4 mm, and said catalytic converter shell thickness is 1 mm to 2 mm.

21. The method of claim 17, wherein said end portion of said catalytic converter shell comprises a retention feature selected from the group consisting of bumps, flares, grooves, and any combination comprising at least one of the foregoing.

22. The method of claim 17, wherein said manifold comprises cast iron and said catalytic converter shell comprises sheet metal.

23. The method of claim 17, wherein said exhaust manifold is constructed of cast iron and said catalytic converter shell is constructed of sheet metal.

* * * * *